United States Patent

[11] 3,567,012

[72] Inventor  Fausto Celorio Mendoza
               Cumbres de Acultzingo No. 185, Lomas de
               Chapultepec, Mexico City 10, Mexico
[21] Appl. No. 762,257
[22] Filed     Sept. 16, 1968
[45] Patented  Mar. 2, 1971

[54] CONVEYING APPARATUS
     4 Claims, 7 Drawing Figs.
[52] U.S. Cl. ................................................. 198/220,
                                                         209/365
[51] Int. Cl. ...................................................... B65g 27/32
[50] Field of Search ............................................ 198/220
         (D20), 220 (B10); 209/255, 258, 259, 325, 329,
                                                     365, 365.1

[56]                    References Cited
                   UNITED STATES PATENTS
     3,236,381  2/1966  Poynter ...................... 209/335

3,021,952  2/1962  Powell ......................... 209/339
                        FOREIGN PATENTS
       851,300 10/1952  Germany ...................... 209/365

Primary Examiner—Robert G. Sheridan
Assistant Examiner—George F. Abraham
Attorney—Jeffers & Puckert ABSTRACT: This invention concerns a conveyor having a moveable plate and in which a vibratory or reciprocating motion is imparted to the plate so that articles are conveyed on the surface thereof. An eccentric is driven by a motor to cause the reciprocatory motion of the plate and control means is provided for changing the position of the eccentric to adjust the speed and direction of motion of articles on the conveyor plate.

INVENTOR
FAUSTO CELORIO MENDOZA
BY Jeffers and Young
ATTORNEYS

INVENTOR
FAUSTO CELORIO MENDOZA

BY Jeffers and Young
ATTORNEYS

CONVEYING APPARATUS

This invention relates to an improved conveyor or transportation system and, more particularly, to a transportation system in which a reciprocating or vibratory movement is given to a conveying or transporting member for causing the product to be conveyed or transported to move in the direction and at the speed desired.

The conveyor or transportation system of the present invention has a large field of application, because a great variety of articles can be transported or conveyed thereby independently of the size and shape thereof.

It is generally known that conveying or transportation systems have recently attained wide acceptance due, in particular, to automation and to the need for reduced labor costs and greater speed of movement of articles being processed. Automatic transportation or conveying of articles is, therefore, an operation that has become most desirable in many industries and absolutely necessary in others.

Various systems are known and have been utilized for the automatic conveying of articles. However, all of the systems currently known operate more or less in accordance with one and the same principle, namely, the principle of a surface supporting the articles and moving, or moveable, in a certain direction to advance the articles in the said direction.

One of the more generally known, and more important, transportation systems is that employing endless belts for conveying articles from a given place to another. Such endless belts operate through the rotation of two end rolls, about which the belt is entrained, although there can also be other intermediate rotating rolls, or by means of rotary sprockets that drive the endless belt in forward motion on the upper portion of the belt and in backward motion on the lower portion thereof. The backward motion of the belt's lower portion is not, of course, taken advantage of at all.

Another important system for the conveyance of articles is one employing a series of rotatable rolls which, due to their rotation, support and move the product from one place to another.

In conventional systems, above described, the rotation of some of the parts constituting the conveyance system proper is always necessary.

Referring to endless belts, these devices have a series of disadvantages inasmuch as the use thereof involves relatively high expense due to the large number of costly elements generally constituting a device of this nature. It is evident that, in order to convey an object through a predetermined length, it is necessary that the actual length of the belt be at least twice that predetermined length because, while half of the actual length of the belt is executing a forward working motion, the other half of the actual length of the belt is executing a backward and idle motion. Moreover, such devices require maintenance that is both time consuming and expensive. Additionally, the space requirements for endless belt conveying systems is substantial and the systems are not easily moved about.

All transportation systems, endless belts and conveying rolls included, have offered a number of problems, which previous to the present invention had not been solved.

For example, it is, at times, desirable to reverse the direction of movement of the articles being conveyed. Such a reversing operation is difficult with known conveying systems because to accomplish it the use of certain type of motors, for example, reversible motors, is required, and this represents a considerable additional expense.

On the other hand, it happens quite often that in such operations as quality control operations, in which certain products are being carefully inspected, the operator overlooks a number of articles, which thus escape inspection, due to the fact that arresting the conveyed articles implies stopping all of the conveying system, whereby, in order to inspect all of the products, it is necessary to halt the conveyor system for the examination of the product, and later to start the conveyor system again which, of course, is inconvenient and not always possible.

At other times, it is highly desirable to regulate the speed at which the products are conveyed. This is possible only through the use of variable speed motors or similar complicated and expensive devices, any of which call for additional cost.

With the foregoing in mind, the principal objective of the present invention is the provision of a system for the conveyance of articles, which operates on principles different from what has been used in conveying systems heretofore.

Another object of the present invention is the provision of a system for the transportation of articles, in which a reciprocating motion is given to the conveying device so as to secure the transportation of an article.

Still another object of the present invention is the provision of a transportation system in which the direction of movement of the articles being transported can be reversed easily.

It is an additional object of the present invention to provide a conveying system in which the articles being transported can easily be stopped.

Still another object of the present invention is to provide a conveying system in which the speed at which the articles are being transported can be varied in an extremely simple manner.

A particular object of the present invention is the provision of a conveyor system in which the direction of movement of the articles being transported can be reversed while using a conventional unidirectional motor.

Another particular object of the present invention is the provision of a conveying system in which the movement of the articles being transported can be halted without stopping or disconnecting the conveying device.

Still another object is the provision of an improved conveying system in which a variation in the transportation speed of the articles can be effected without requiring the use of variable speed motors or any other additional devices.

Still another object of the invention is the provision of a conveying system which will occupy much smaller space than prior art systems.

Still another object is the provision of a conveying system which is of a simple design, and has but a few parts, and requires only a small amount of maintenance.

These and other objects and advantages of the present invention will become more clearly apparent from the following description taken together with the accompanying drawings, in which.

Figure 1:
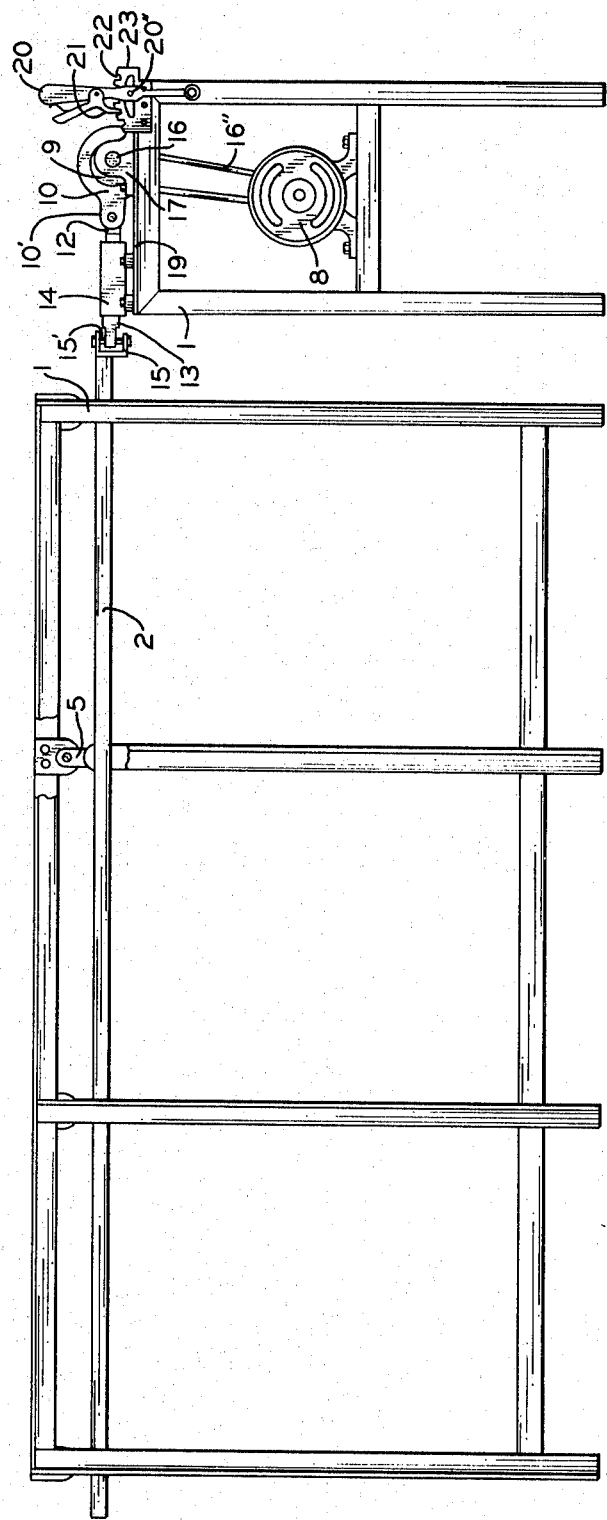
FIG. 1 is a side view of a conveying device according to the present invention.

Referring to the drawings more in detail, and more particularly to FIG. 1, it may be observed that the improved conveying system of the present invention comprises a frame 1 in which a transporting or conveying plate 2 is suspended. Plate 2 has a flat horizontal main portion and upstanding side flanges. Transporting plate 2 is suspended in the frame 1 by means of special suspension elements, each comprising a cup 3 in which a ball bearing 4 is seated. Each cup 3 is fixed at a point in the frame, and the ball bearing 4 seated therein is engaged with the upper end of a suspension arm 5. The lower end of each arm 5 engages a ball bearing, not shown which is seated in a cup 7 fixed at a point on the edge of the transporting plate 2.

As previously mentioned, a reciprocating motion is communicated to the transporting plate, and this motion is obtained by means of a power source 8 that actuates an eccentric 9. Eccentric 9, in turn, is surrounded by a ring or sleeve 10 which has a projection 10' provided with a slot 11 in which the projection 12 of motion transmitting bar 13 is received. Bar 13 is, additionally, provided with a guide sleeve 14 which is mounted on a carriage 19 that is slidably supported on the adjacent portion of frame 1. Bar 13 has at the other end thereof, an aperture that receives vertical post 15' of a yoke mechanism 15 secured to the adjacent end of plate 2. Post 15' permits vertical movement of the transporting plate relative to bar 13.

It is important for the suspension elements which connect the transporting plate to frame 1 to be precisely in a vertical position in order to secure the ready inversion, or reversal, of the direction of movement of the articles being conveyed and to permit easy control of the conveying speed.

When the device described above in in operation, the power supply source 8, such as a unidirectional motor, will cause the eccentric 9 to rotate, whereby a horizontal reciprocating motion will be imparted to bar 13 and which motion will be communicated to the transporting plate 2.

The post 15' at the end of bar 13 adjacent plate 2 will allow for a vertical movement of the transporting plate as it swings under the control of the suspension arms 5. The combination of the horizontal and the vertical movement taken by plate 2 will cause articles thereon to advance across the plate in the direction that the plate moves horizontally while it is moving upwardly.

Generally, only a small almost imperceptible tilting movement of the plate is required to effect motion of the article being transported on the plate.

As previously stated, the speed of the product can be at will increased or diminished in a simple manner. The speed of conveyance can be varied by modifying the inclination of all the suspension arms 5 simultaneously.

According to the above described mechanism, it will be readily apparent that the suspension arms are designed to take a circular movement at their lower ends within a circular path which extends somewhat less than 180°.

Figure 2:
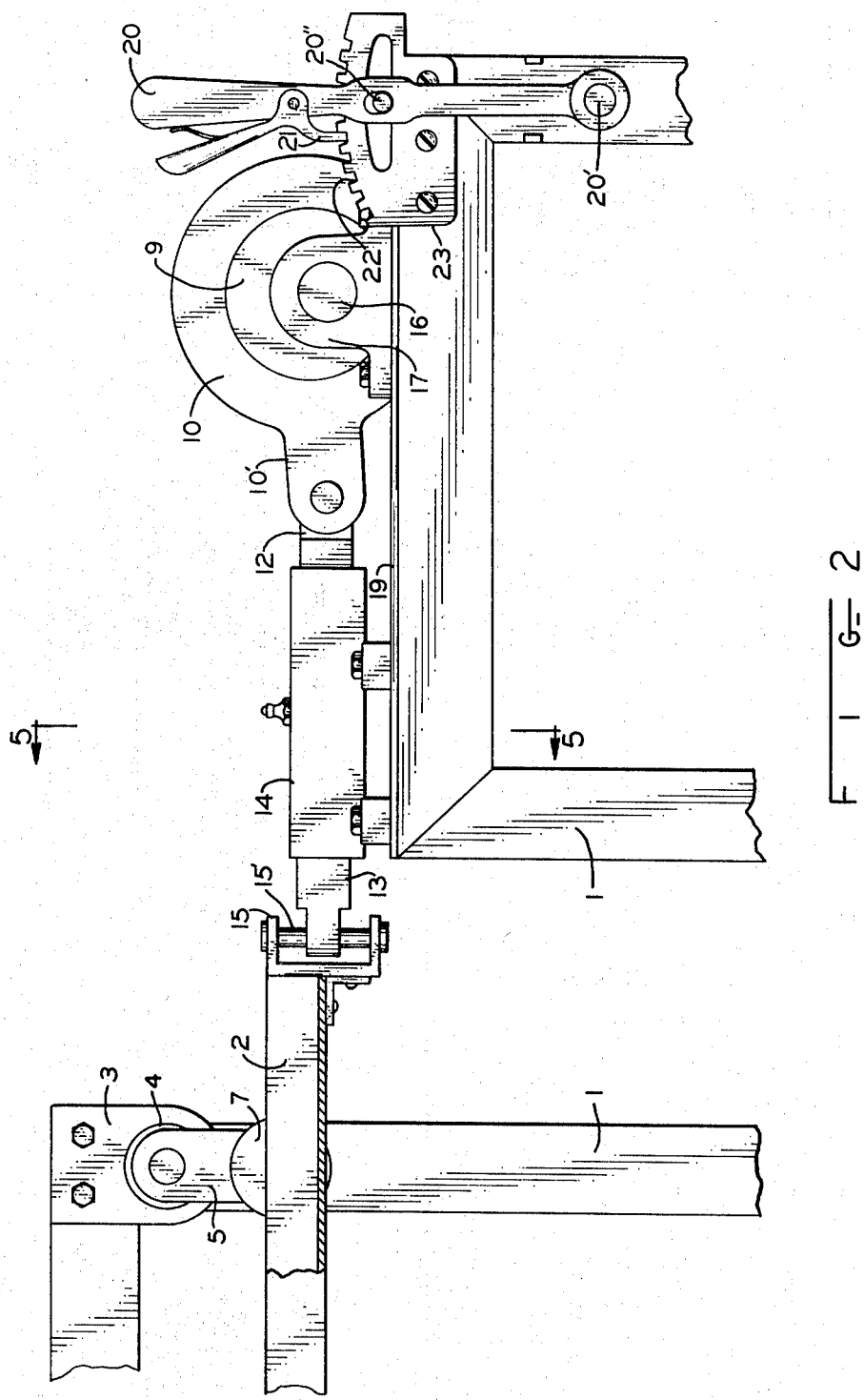
FIG. 2 is a side view of the said device, showing the mechanism that communicates motion to the conveying surface.
Figure 3:
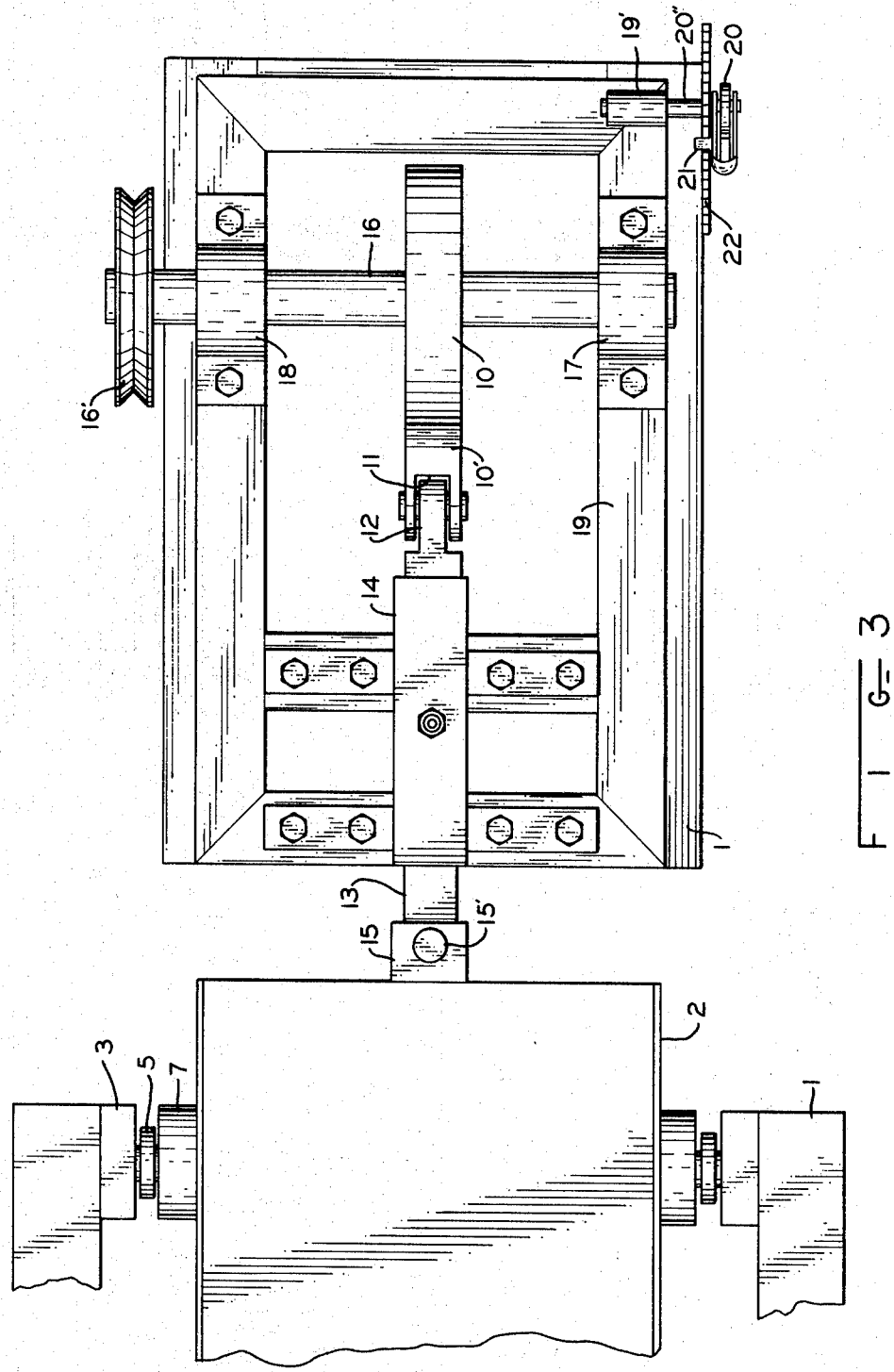
FIG. 3 is a top plan view of the device.
Figure 4:
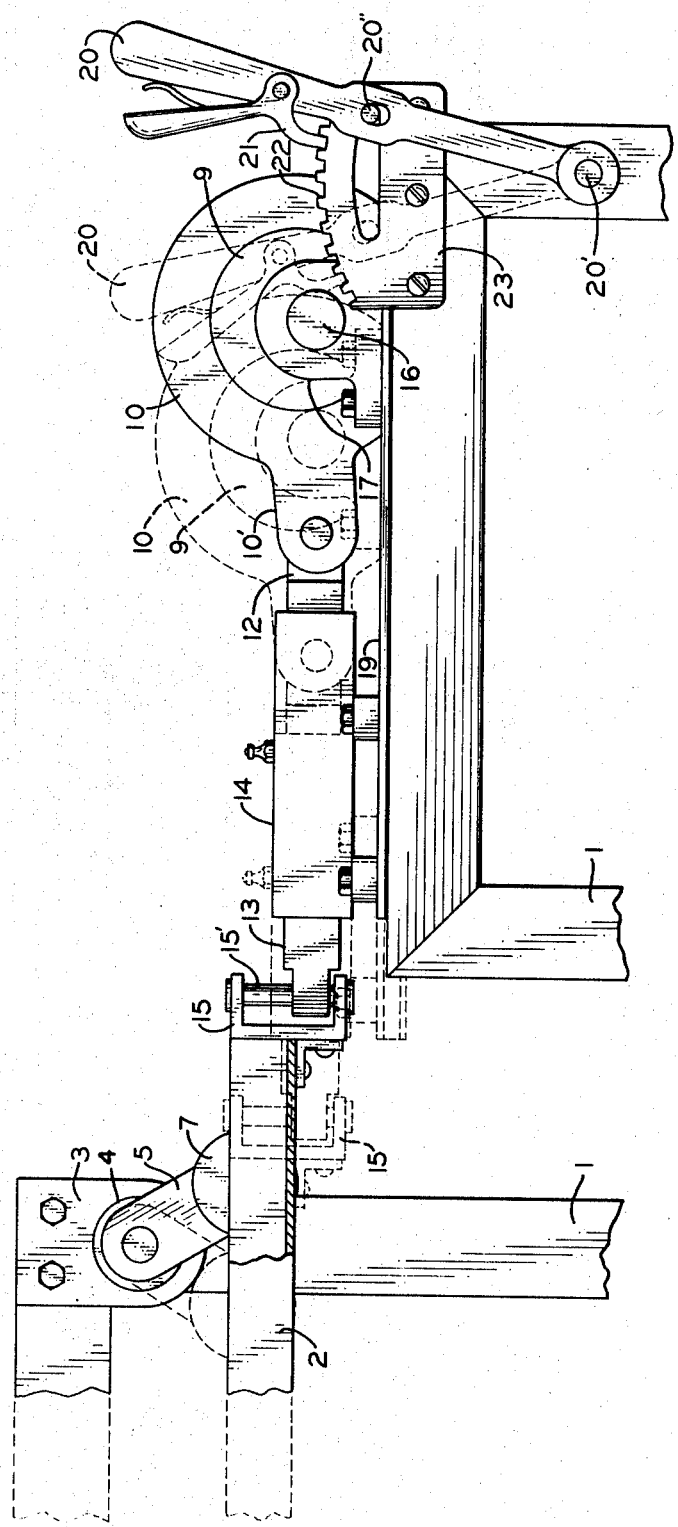
FIG. 4 is a side view of the conveying device, showing the transportation controlling mechanism.
Figure 5:
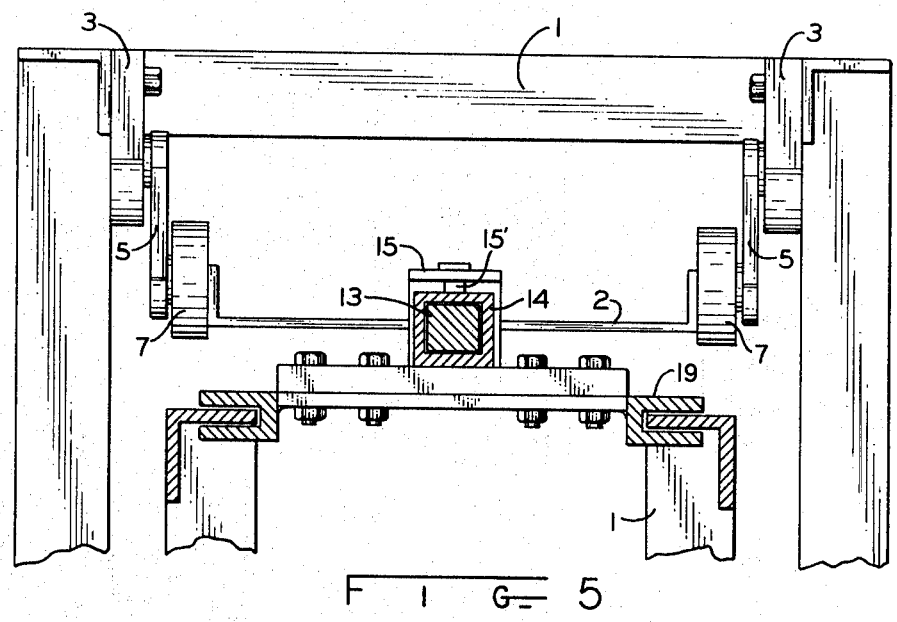
FIG. 5 is a view taken along line V-V of FIG. 2.

As bar 13 reciprocates, plate 2 will always take the same amount of horizontal movement but the amount and direction of the vertical movement thereof will vary with the inclination of suspension arms 5 from a vertical position. If, for example, the median position of the arms 5, as bar 13 reciprocates, is vertical, no movement of articles on plate 2 in either direction will occur over a period of time because the influence on the articles to move in one direction on the plate is equal to the influence on the articles to move in the opposite direction on the plate. The mechanism is shown in this position of adjustment in FIG. 2.

Figure 6:
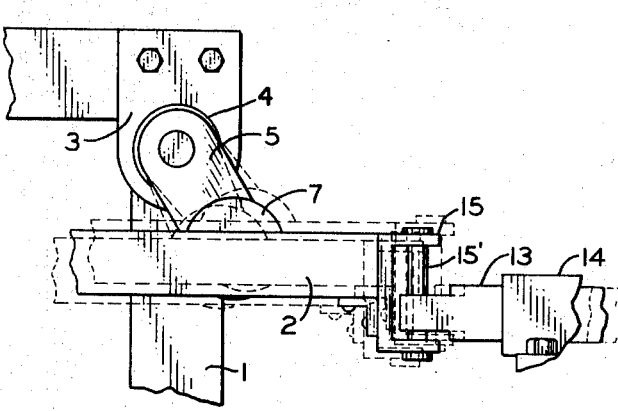
FIG. 6 is a side view of the suspension element in one of its inclination positions.
Figure 7:
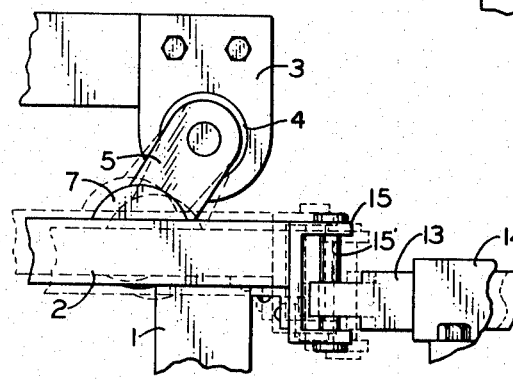
FIG. 7 is a side view of the suspension element in another of its inclination positions.

To cause articles to move in one direction on plate 2, the inclination of suspension arms 5 is changed as in FIGS. 6 and 7. In FIG. 6, articles on plate 2 will move toward the right thereon because suspension arms 5 are inclined toward the left. Plate 2, arms 5, and bar 13 are shown in their median position in full lines in FIG. 6 while the limit positions thereof are shown in dashed lines. Plate 2 moves upwardly and to the right and then downwardly and to the left and at such a speed that articles thereon are under the influence of plate 2 during the rightward movement of plate 2, but are not under such influence during leftward movement of plate 2. The articles thus progress toward the right in FIG. 6 and at a speed which can be varied by varying the inclination of arms 5 in the median position thereof.

In FIG. 7, arms 5 incline to the right in the median position thereof and articles on plate 2 thus move across plate 2 toward the left.

A mechanism provided for controlling the inclination of the suspension elements and, consequently, the speed and direction of the products being conveyed will now be described.

Eccentric 9 is mounted on a central portion of a shaft 16 which, at its ends, is rotatable in bearings 17, 18 mounted on two rails 14' slidably supported on side elements of frame 1 and forming a part of carriage 19. Carriage 19 is moveable on frame 1 by means of a lever 20 which is pivoted to frame 1 at 20' and connected to carriage 19 by eye 19' on the carriage and pin 20'' on lever 20 which engages the eye. When lever 20 is adjusted, the carriage 19 is adjusted and the position of eccentric 9 changes and the angularity of suspension arms 5 also changes. Any desired operative position of eccentric 9 can be obtained to get forward feed, reverse feed, no feed, and to change the speed of the forward and reverse feeds.

Lever 20 has a latch finger 21 pivoted thereto adapted for detachably engaging teeth 22 of a curved rack member 23 fixed to one of the side elements of frame 1. The pivot point 20' preferably coincides with the center of the curvature of the rack.

Obviously the control mechanism described above can be replaced by any other mechanism, provided it will perform the same functions.

Shaft 16 may carry a pulley 16' which is driven by a belt 16'' which passes over a pulley on the output shaft of motor 8. Belt 16'' is sufficiently yieldable to permit adjustment of carriage 19 on frame 1 while motor 8 remains stationary without disrupting the driving connection of the motor with the shaft. However, spring loaded idler pulley means could be used to hold belt 16'' taut, if desired.

Although a preferred embodiment of the present invention has been described and illustrated, it is evident that various changes and modifications may be effected in the structure. Accordingly, it is intended that the specification and drawings are to be taken only as illustrative of the invention and that the extent of the present invention is defined in the following claims.

I claim:

1. In a conveying apparatus: a frame; a horizontal plate adapted to receive articles to be fed across the plate by vibration thereof; suspension elements swingably suspending said plate in said frame for movement of the plate in the frame in parallelism with itself; power operable means carried by said frame and connected to said plate for imparting horizontal reciprocatory motion thereto in the direction of the length of said plate, said power operable means comprising a unidirectional shaft, an eccentric mounted on and driven by said shaft, a sleeve or ring surrounding the eccentric, a substantially horizontal bar extending in the direction of horizontal movement of said plate, first means at one end of the bar connecting it to said sleeve or ring, and second means at the other end of the bar connecting it to said plate, said second means including means permitting said plate to move vertically relative to said bar, said bar being guided for movement in a straight line; and means for adjusting the inclination of said suspension elements relative to the plane of said plate.

2. In a conveying apparatus: a frame; a horizontal plate adapted to receive articles to be fed across the plate by vibration thereof; suspension elements swingably suspending said plate in said frame for movement of the plate in the frame in parallelism with itself, said suspension elements comprising parallel arms distributed about said plate and pivotally connected at their lower ends to said plate and at their upper ends to said frame; power operable means carried by said frame and connected to said plate for imparting horizontal reciprocatory motion thereto in the direction of the length of said plate, said power operable means comprising a unidirectional shaft, an eccentric mounted on and driven by said shaft, a sleeve or ring surrounding the eccentric, a substantially horizontal bar extending in the direction of horizontal movement of said plate, first means at one end of the bar connecting it to said sleeve or ring, and second means at the other end of said bar connecting it to said plate; means for adjusting the inclination of said suspension elements relative to the plane of said plate; a carriage slidable on said frame in the direction of the length of said plate; means supporting said shaft in said carriage; and adjusting means for adjusting the position of said carriage on said frame for adjusting the inclination of said suspension arms and, therefor, the direction and speed of travel of articles across said plate.

3. A conveying apparatus according to claim 2, in which said adjusting means includes a lever pivoted to said frame and to said carriage.

4. A conveying apparatus according to claim 3, in which a notched member is mounted on the frame adjacent said lever and said lever has a finger member moveably carried thereby and detachably engageable with the notches in said notched member.